United States Patent Office

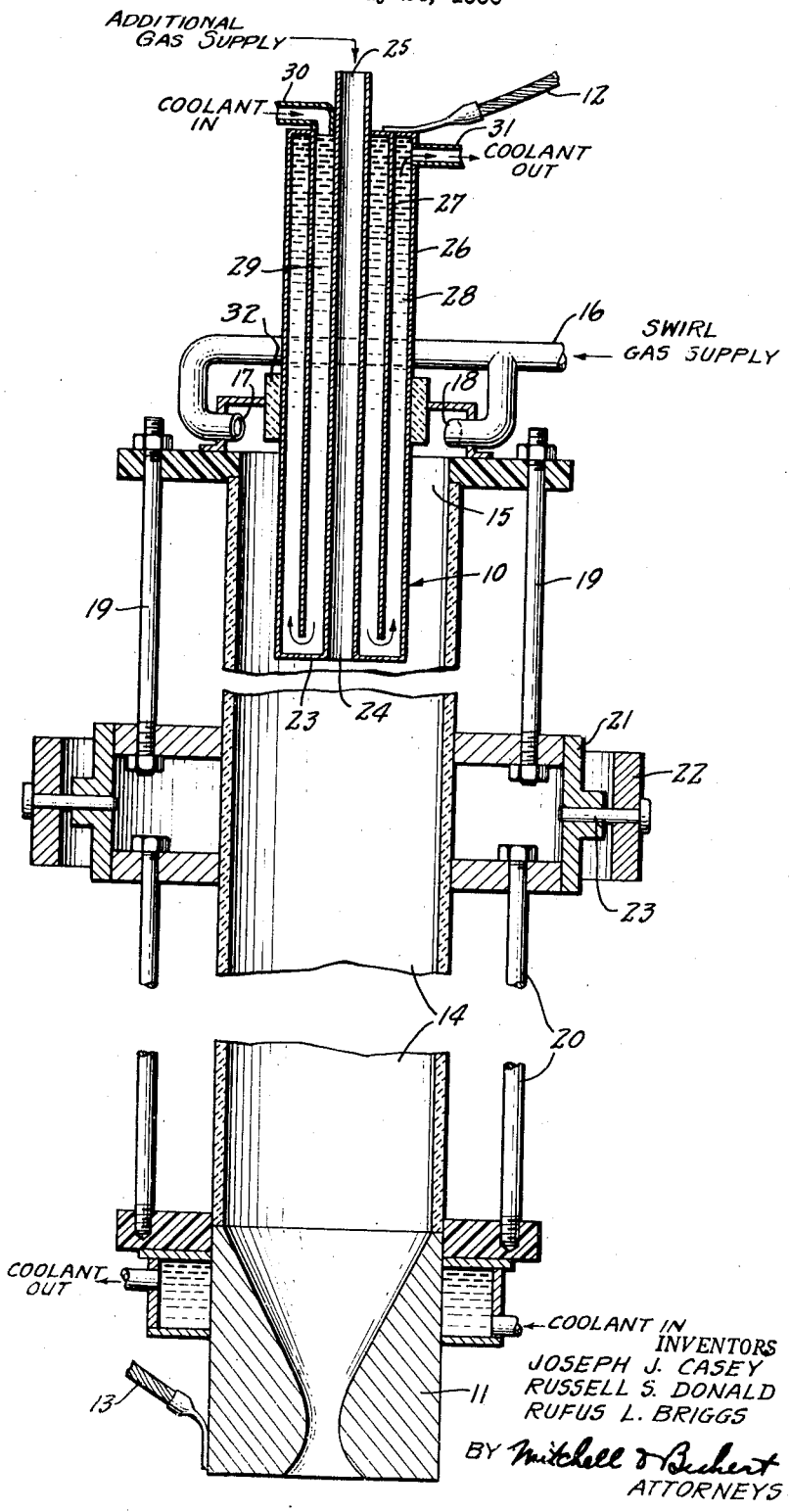

2,892,067
ELECTRIC-ARC TORCH

Russell S. Donald, Trumbull, Rufus L. Briggs, Bridgeport, and Joseph J. Casey, Bethel, Conn.

Application May 24, 1956, Serial No. 596,375

10 Claims. (Cl. 219—75)

(Filed under Rule 47(b) and 35 U.S.C. 118)

Our invention relates to an improved high-temperature electric-arc torch construction, and in particular to the variety in which a continuous gas flow along the arc path blows the arc beyond a hollow downstream electrode.

It is an object of the invention to provide an improved torch construction of the character indicated.

It is another object to provide an electric-arc torch lending itself to the development of high heat intensities without too substantially elevating the temperature of physical parts of the torch.

It is also an object to provide an improved torch construction wherein erosion of the target surface of the upstream electrode is reduced to relatively insignificant proportions, and in which torch life and capacity are substantially enhanced.

It is a further object to provide an improved torch of the character indicated wherein independent gas flows may be separately introduced into the arc chamber.

It is a specific object to meet the above objects with a construction in which a steady arc may be developed for continuous operation and yet in which the arc may be continuously shifted in its point of impingement with physical parts of the torch, whereby pitting and premature erosion are substantially eliminated.

Other objects and various further features of novelty and invention will be pointed out or will occur to those skilled in the art from a reading of the following specification in conjunction with the accompanying drawing. Said drawing shows, for illustrative purposes only, a preferred form of the invention and is a simplified longitudinal sectional view of an electric-arc torch incorporating features of our invention.

Briefly stated, our invention contemplates an improved electric-arc torch of the variety in which a swirling gas flow along an elongated arc is employed to define the arc and to project the same beyond the end of a hollow downstream electrode. The present invention is particularly directed to an improved upstream-electrode construction, whereby the arc will inherently be shifted to strike progressively different parts of the face or striking surface of the upstream electrode during any continuous operation of the torch. In this manner, repeated arcing to the same point is avoided, and electrode, and therefore torch, life is materially enhanced.

Referring to the drawing, our invention is shown in application to an electric-arc torch comprising an upstream electrode 10 and a hollow or annular downstream electrode 11; said electrodes may be electrically excited by suitable source means (not shown), but suggested by lead connections 12 to the upstream electrode and 13 to the downstream electrode. The downstream electrode may be internally contoured as a convergent nozzle, for greater concentration of the arc upon discharge from the torch, as will be understood.

An arc chamber 14 communicates with the bore of the downstream electrode 11 and overlaps with the upstream electrode 10 to define an annular inlet 15 constituting part of the gas-supply means. In the form shown, the gas is supplied, as at inlet 16, to a system of pipes communicating with openings or nozzles 17—18, preferably uniformly distributed about the axis of the torch and angularly inclined so as to develop within the chamber 14 a consistent helical or swirling gas flow. This swirling action continues down the length of the chamber 14 and through the nozzle electrode 11 and serves to confine or concentrate arc plasma centrally of the chamber 14. The chamber 14 may be metallic, but insulated from the electrodes 10—11; however, in the form shown, the chamber 14 is itself of insulating material as, for example, a suitable ceramic.

A system of tie rods 19—20 serves to detachably connect the parts and to support the same from a central framework 21, shown suspended from a yoke 22 about a tilting axis 23, so as to facilitate directional application of the arc flame issuing from the torch.

In accordance with a feature of the invention, erosion of the face 23 of the upstream electrode 10 can be substantially eliminated by giving the surface 23 an annular configuration and by fabricating face 23 from relatively thin, well-cooled, heat-conductive material. In the form shown, the upstream electrode 10 is of hollow tubular construction with the target 23 surrounding the downstream open end 24 of the tube of electrode 10. The continuous open nature of tube 24 will be appreciated as facilitating the introduction of a wire, rod, or the like by way of the other open end 25 of the tube of electrode 10 for starting operations, as, for example, by extending such rod or wire through the full length of electrode 10 and into contact with the downstream electrode 11. After contact, such rod or wire may be bodily withdrawn and the arc established continuously between the striking surface 23 and out the end of the downstream electrode 11 to the outer surface thereof. Alternatively, the central tube 24—25 of the upstream electrode may provide a means for introducing materials, such as an additional gas, centrally of the arc chamber, such gases may have oxidizing or reducing properties depending upon the thermal or other reactive effects desired within the torch for specific uses thereof.

As indicated generally above, prolonged life of the surface 23 of the upstream electrode is attributable to a plurality of cooperating factors. The annular configuration assures that the arc can never strike and permanently locate on the center of the face of electrode 10, and, to provide further assurance against arc anchorage at a fixed point on the upstream electrode, we prefer that the opening 24 in the target shall be relatively large, as suggested by the drawing. As another factor, the gas flow induced at 17—18 promotes a consistent strong helical progression down the chamber 14; this flow creates forces tending to shift the instantaneous striking point of the arc on the target 23. Also, the preferred excitation at 12—13 involves alternating current, so that the arc is in reality high-speed intermittent and has an inherent natural tendency to reestablish itself on the face 23 at a new location, depending upon the instantaneous helical turbulence forces created by the gas-supply mechanism 17—18, with resulting probable incremental angular progression of the most recently ionized local arc path.

As a further highly significant means to prolong the life of the upstream electrode 10, we provide the surface 23 of relatively thin heat-conductive material, such as copper, and we employ a counter-flow cooling mechanism in connection therewith. Such mechanism may involve merely the use of concentric tubes 26—27 defining a first annular cooling passage 28 and a second annular cooling passage 29. In the form shown, an inlet connection 30 to the inner annular region 29 accommodates incoming coolant and conducts the same directly to the backside or base of the face 23, for rapid and efficient extraction of heat in the exhaust passage 28 to the exhaust port 31. The tube 27 is shown extending into close proximity with the backside of the electrode face 23 in order to insure continuous efficient delivery of fresh coolant.

While we are presently unable to specifically identify the reason for greatly improved performance of our electrode 10, we believe it to reside in the cooperative relation between annular configuration of surface 23, helical gas flow, and rapid heat conduction at 23 due (1) to employment of high-conductivity material (e.g. copper) and (2) to the relative thinness of surface 23. If there is insufficient provision for heat-conductivity at 23, e.g. if member 23 is relatively thick or is of a material of inadequate heat conductivity, any given arc-impingement point (on surface 23) can remain sufficiently hot to remain a preferential source for retention of the arc (or for recapture of the arc, for the case of A.-C. operation), all in spite of the helical flow of carrier gas. Furthermore, once a local "hot spot" has been allowed to locally deform (pit) the face 23, whatever the cause, the swirling gas flow can no longer develop the same forces around and across the face 23, so that the ability to develop continuous rotation of the arc-impingement point is undoubtedly impaired, and the arc tends to "home" on the same spot and not to uniformly erode the whole face 23. On the ther hand, since we provide rapid, continuous and adequate heat dissipation, the arc is never allowed to anchor at a single spot on the face 23.

For particular operations of the torch, various arc lengths may be required, and we find it convenient to arrange the upstream electrode 10 for selective longitudinal adjustment. In the form shown, the outer tube 26 of the electrode 10 is frictionally retained in the bushing 32. The degree of frictional engagement is preferably sufficient to permit adjustable longitudinal placement of the target surface 23 with respect to electrode 11, and of course to retain any such adjustment, once made.

It will be seen that we have provided an improved electric-arc torch construction characterized particularly by an inherent ability to operate at high energy levels for prolonged periods of time. Compared to previous arrangements, our upstream-electrode construction substantially completely eliminates upstream-electrode erosion, and the co-axial introduction of additional gas flows is facilitated, thereby rendering the torch more versatile in range of application.

While we have described the invention in detail for the preferred form illustrated, it will be understood that modifications may be made within the scope of the invention as defined in the claims which follow.

We claim:

1. In an electric-arc torch, an elongated arc chamber defining a passage having a gas-supply inlet at the upstream end thereof, said inlet being formed to develop a helical gas flow downstream in said chamber, an upstream electrode centrally positioned within said chamber and including an electrode-striking surface of annular configuration facing downstream within said chamber, said surface having a central opening and being positioned in a region of helical gas flow in said chamber, an annular downstream electrode having a bore communicating with the downstream end of said chamber, said downstream electrode being in its entirety longitudinally spaced from said upstream electrode, and means for connecting an arc potential across said electrodes.

2. A torch according to claim 1, in which said last-defined means includes an alternating-current source.

3. In an electric-arc torch, an elongated arc chamber defining a passage having a gas-supply inlet at the upstream end thereof, said inlet including means developing within said chamber a helical gas flow progressing longitudinally along said chamber, an elongated hollow tubular upstream electrode centrally positioned within said chamber and including an annular striking surface positioned within said chamber downstream from said inlet, said upstream electrode having a bore communicating through the central part of said striking surface to the upstream end of said chamber, an annular downstream electrode having a bore communicating with the downstream end of said chamber, said downstream electrode being in its entirety longitudinally spaced from said upstream electrode, and means for connecting an arc potential across said electrodes.

4. A transducer according to claim 3, in which frictional guide means carried at the upstream end of said chamber supports and engages said upstream electrode for longitudinally guided adjustment with respect to said chamber.

5. In an electric-arc torch, an elongated arc chamber defining a passage having a gas-supply inlet at the upstream end thereof, said inlet including means developing within said chamber a helical gas flow progressing longitudinally along said chamber, an elongated hollow upstream electrode comprising a tube centrally and longitudinally adjustably positioned within said chamber and extending downstream from said inlet, said upstream electrode including a substantially flat relatively thin annular striking-surface member extending radially outwardly and surrounding the downstream open end of the tube of said electrode, counter-flow cooling means surrounding said tube and in heat-conducting relation with the backside of said annular striking-surface member, downstream-electrode means longitudinally spaced in its entirety from said upstream electrode, and means for connecting an arc potential across said electrodes.

6. In an electric-arc torch, an elongated arc chamber defining a passage having a gas-supply inlet at the upstream end thereof, said inlet being formed to develop a helical gas flow downstream in said chamber, an upstream electrode centrally positioned within said chamber and including an electrode-striking surface centrally positioned within and facing downstream in a region of helical gas flow in said chamber, the downstream-exposed electrically conductive face of said surface being annular and being substantially non-conductive centrally thereof, an annular downstream electrode having a bore communicating with the downstream end of said chamber, said downstream electrode being longitudinally spaced in its entirety from said upstream electrode, and means for connecting an arc potential across said electrodes.

7. In an electric-arc torch, an elongated arc chamber defining a passage having a gas-supply inlet at the upstream end thereof, said inlet being formed to develop a helical gas flow downstream in said chamber, an upstream electrode centrally positioned within said chamber and including an electrode-striking surface of relatively thin electrically and thermally conductive material, said striking surface being in a region of helical gas flow in said chamber, means establishing a continuous flow of liquid coolant over the backside of said striking surface, said striking surface being substantially electrically non-conductive centrally thereof, an annular downstream electrode wholly spaced longitudinally from said upstream electrode and having a bore communicating with the downstream end of said chamber, and means for connecting an arc potential across said electrodes.

8. In an electric-arc torch, an elongated arc chamber defining a passage having a gas-supply inlet at the upstream end thereof, said inlet being formed to develop a helical gas flow downstream in said chamber, and upstream electrode centrally positioned within said chamber at a region of helical gas flow and including an electrode-striking surface having a central opening therein, gas-supply means communicating with said central opening and discharging downstream into said chamber, an annular downstream electrode wholly separately longitudinally from said upstream electrode and having a bore communicating with the downstream end of said chamber, and means for connecting an arc potential across said electrodes.

9. A torch according to claim 8, in which said first and second mentioned gas-supply means are independent.

10. In an electric-arc torch, an elongated tubular arc chamber, an upstream electrode and a downstream electrode at longitudinally spaced parts of said chamber, inlet gas-supply means surrounding said upstream electrode and communicating with said chamber, said gas-supply means including means developing a helical gas flow in said chamber, said helical flow extending downstream at least from the vicinity of said upstream electrode, said upstream electrode being hollow and including a thin-walled striking-surface member substantially concentric with the axis of helical gas flow in said chamber, said striking-surface member having a central opening on said axis, whereby an arc striking said surface member must do so off said axis, and whereby the helical gas flow will cause the instantaneous striking point to progress around the downstream-facing side of said surface member, continuously operative cooling means in direct heat-removing relation with the other side of said surface member, and means for connecting an arc potential across said electrodes.

References Cited in the file of this patent

UNITED STATES PATENTS

| | | |
|---|---|---|
| 1,638,336 | Himes | Aug. 9, 1927 |
| 2,587,331 | Jordan | Feb. 26, 1952 |
| 2,768,279 | Rava | Oct. 23, 1956 |
| 2,769,079 | Briggs | Oct. 30, 1956 |